(12) United States Patent  
Kirillov

(10) Patent No.: US 12,474,448 B2  
(45) Date of Patent: Nov. 18, 2025

(54) HYBRID LIDAR RECEIVER AND LIDAR METHODS

(71) Applicant: Infineon Technologies AG, Neubiberg (DE)

(72) Inventor: Boris Kirillov, Judendorf-Straßenge (AT)

(73) Assignee: Infineon Technologies AG, Neubiberg (DE)

( * ) Notice: Subject to any disclaimer, the term of this patent is extended or adjusted under 35 U.S.C. 154(b) by 856 days.

(21) Appl. No.: 17/715,303

(22) Filed: Apr. 7, 2022

(65) Prior Publication Data

US 2022/0357427 A1 Nov. 10, 2022

Related U.S. Application Data

(63) Continuation of application No. 16/116,068, filed on Aug. 29, 2018, now Pat. No. 11,353,557.  
(Continued)

(51) Int. Cl.
*G01S 7/481* (2006.01)
*G01S 7/4863* (2020.01)
(Continued)

(52) U.S. Cl.
CPC .......... *G01S 7/4815* (2013.01); *G01S 7/4863* (2013.01); *G01S 7/4865* (2013.01); *G01S 17/894* (2020.01)

(58) Field of Classification Search
None
See application file for complete search history.

(56) References Cited

U.S. PATENT DOCUMENTS 7,274,815 B1 * 9/2007 Smithpeter .......... G06V 10/145  
                                                                               382/154  
7,629,916 B2    12/2009  Wiesbauer et al.  
(Continued)

FOREIGN PATENT DOCUMENTS

CN        101577549 A    11/2009  
CN        104898125 A     9/2015  
                 (Continued)

OTHER PUBLICATIONS

Lu S., et al., "Three-dimensional Imaging Method of Lidar Based on Sparse Sampling Technique," Chinese Journal of Quantum Electronics, Jan. 2018, vol. 35(1), pp. 95-101.  
(Continued)

*Primary Examiner* — Luke D Ratcliffe  
(74) *Attorney, Agent, or Firm* — Harrity & Harrity, LLP

(57) ABSTRACT

A method of scanning a field of view implemented by a Light Detection and Ranging (LIDAR) system includes transmitting pulsed light into the field of view; receiving, by a photodetector array, light from the field of view, wherein the photodetector array is configured to receive the light from objects in the field of view corresponding to ambient light and the pulsed light reflected therefrom; generating, by the photodetector array, DC signal components exclusively attributed to receiving the ambient light and AC signal components exclusively attributed to receiving the pulsed light; separating, by a processing circuit, the DC signal components from the AC signal components; generating, by the processing circuit, a two-dimensional image that represents an ambient light image of the field of view from the DC signal components; and generating, by the processing circuit, a three-dimensional image of the field of view from the AC signal components.

12 Claims, 7 Drawing Sheets

Related U.S. Application Data

(60) Provisional application No. 62/680,139, filed on Jun. 4, 2018.

(51) Int. Cl.
*G01S 7/4865* (2020.01)
*G01S 17/894* (2020.01)

(56) References Cited

U.S. PATENT DOCUMENTS

| | | | |
|---|---|---|---|
| 9,823,350 | B2 | 11/2017 | Fluckiger |
| 9,831,630 | B2 | 11/2017 | Lipson |
| 9,971,023 | B2 | 5/2018 | Dielacher et al. |
| 11,353,557 | B2 | 6/2022 | Kirillov |
| 2010/0332078 | A1 | 12/2010 | Hering et al. |
| 2012/0038790 | A1 | 2/2012 | Kelly et al. |
| 2012/0038817 | A1 | 2/2012 | Mcmackin et al. |
| 2017/0357000 | A1 | 12/2017 | Bartlett et al. |
| 2018/0113200 | A1 | 4/2018 | Steinberg et al. |
| 2018/0113216 | A1 | 4/2018 | Kremer et al. |
| 2018/0306920 | A1 | 10/2018 | Kramper et al. |
| 2019/0011558 | A1* | 1/2019 | Crouch ............... G08G 1/16 |
| 2019/0011567 | A1 | 1/2019 | Pacala et al. |
| 2019/0056498 | A1* | 2/2019 | Sonn ............... G01S 7/4865 |
| 2019/0285734 | A1 | 9/2019 | Van Lierop et al. |
| 2019/0331775 | A1* | 10/2019 | Song ............... G01S 7/4816 |

FOREIGN PATENT DOCUMENTS

| | | |
|---|---|---|
| CN | 106125086 A | 11/2016 |
| CN | 106796293 A | 5/2017 |
| CN | 107219532 A | 9/2017 |
| WO | 2017149370 A1 | 9/2017 |

OTHER PUBLICATIONS

Qiao D., et al., "An Exploration for the Degradation Behavior of 2-D Electrostatic Microscanners by Accelerated Lifetime Test," Microelectronics Reliability, Jan. 2018, vol. 80, pp. 284-293.

\* cited by examiner

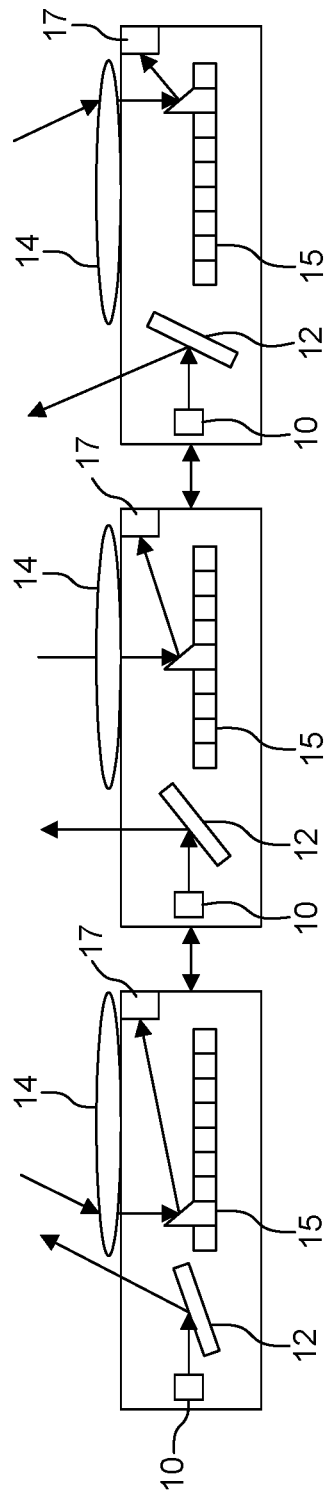
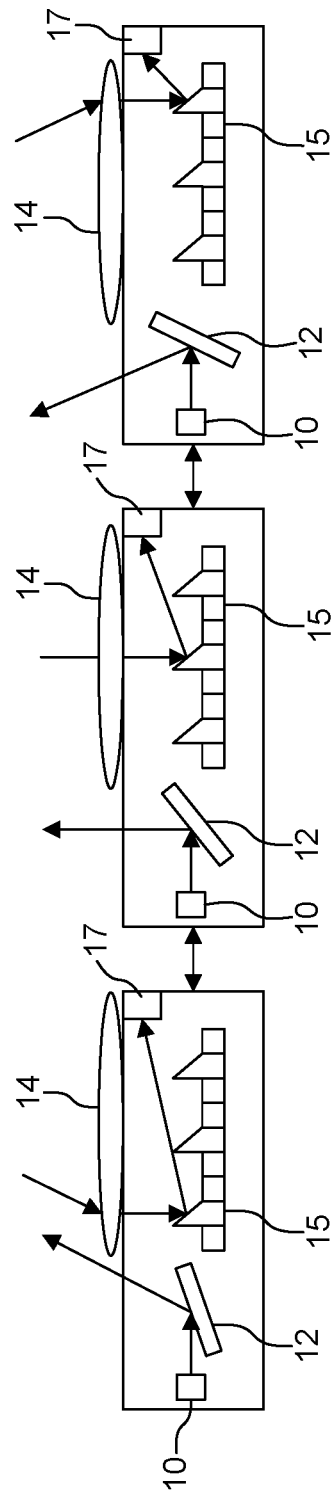
FIG. 3
FIG. 4

HYBRID LIDAR RECEIVER AND LIDAR METHODS

CROSS-REFERENCE TO RELATED APPLICATIONS

This application is a continuation of U.S. patent application Ser. No. 16/116,068 filed Aug. 29, 2018, which claims the benefit of Provisional Application No. 62/680,139 filed Jun. 4, 2018, which are incorporated by reference as if fully set forth.

FIELD

The present disclosure relates generally to devices and methods for Light Detection and Ranging (LIDAR).

BACKGROUND

Light Detection and Ranging (LIDAR), is a remote sensing method that uses light in the form of a pulsed laser to measure ranges (variable distances) to one or more objects in a field of view. In particular, light is transmitted towards the object. Arrays of photodetectors receive reflections from objects illuminated by the light, and the time it takes for the reflections to arrive at various sensors in the photodetector array is determined. This is also referred to as measuring time-of-flight (TOF). LIDAR systems form depth measurements and make distance measurements by mapping the distance to objects based on the time-of-flight computations. Thus, the time-of-flight computations can create distance and depth maps, which may be used to generate images.

However, ambient light may also be received at a LIDAR receiver and may contribute to the photogenerated signals used to generate the distance and depth maps. This ambient light may have the undesirable effect of missing objects, detecting ghost objects or creating noise in the distance and depth maps. Thus, it may be desirable to develop a LIDAR system that is robust to noise caused by ambient light.

In addition, when using a one-dimensional (1D) photodetector array at the receiver, the vertical resolution of the image is limited by the number of pixels of the photodetector array aligned in the vertical direction. Thus, it may be desirable to develop a LIDAR system that increases the vertical resolution of a 1D photodetector array.

SUMMARY

Embodiments provide Light Detection and Ranging (LIDAR) systems and LIDAR scanning methods.

According to one or more embodiments, a LIDAR system includes a receiver that includes a photodetector array configured to detect light and generate electrical signals based on the detected light; and a spatial light modulator having an array of reflective elements that includes a plurality of columns, each column of the plurality of columns includes a plurality of reflective elements configured to switchably direct the light towards the photodetector array, where the spatial light modulator is configured to receive the light from objects in a field of view corresponding to ambient light reflected therefrom. The LIDAR system further includes a controller configured to sequentially activate the plurality of columns of the spatial light modulator such that the plurality of reflective elements of an activated column directs the light towards the photodetector array; and at least one processor configured to receive the electrical signals from the photodetector array and generate a two-dimensional image that represents an ambient light image of the field of view. Each pixel of the ambient light image indicates a light intensity of the ambient light corresponding to this pixel.

According to one or more embodiments, a method of scanning a field of view implemented by a LIDAR system is provided. The method includes receiving beams of light from the field of view on a spatial light modulator that includes a two-dimensional array of reflective elements arranged in a plurality of rows and a plurality of columns, where each beam of light extends along one of the plurality of columns; determining a first set of spatially separated columns of the plurality of columns that correspond to receiving directions of a first set of receiving beams of light corresponding to a first scanning procedure; and activating the first set of spatially separated columns during the first scanning procedure such that each of the first set of receiving beams of light is directed towards a photodetector array, while deactivating remaining columns of the plurality of columns during the first scanning procedure such that light is directed away from the photodetector array.

According to one or more embodiments, a method of scanning a field of view implemented by a LIDAR system is provided. The method includes receiving beams of light from a field of view on a spatial light modulator that includes a two-dimensional array of reflective elements arranged in a plurality of rows and a plurality of columns, where each beam of light extends along one of the plurality of columns; arranging the reflective elements in each of the plurality of columns into groups, wherein the reflective elements of a group are configured to, when activated, direct light towards a same pixel of a photodetector array, and the reflective elements of different groups in a same column are configured to, when activated, direct light towards different pixels of the photodetector array; selecting a set of columns of the plurality of columns that correspond to receiving directions the beams of light; and interleaving an activation of the reflective elements in each group of the selected set of columns for different scanning periods, while deactivating remaining reflective elements of the spatial light modulator during the different scanning periods.

BRIEF DESCRIPTION OF THE DRAWINGS

Embodiments are described herein making reference to the appended drawings.

FIG. 3 is a cross-sectional diagram of a receiver of the LIDAR scanning system according to one or more embodiments;

FIG. 4 is a cross-sectional diagram of a receiver of the LIDAR scanning system according to one or more embodiments;

DETAILED DESCRIPTION

Figure 1A:
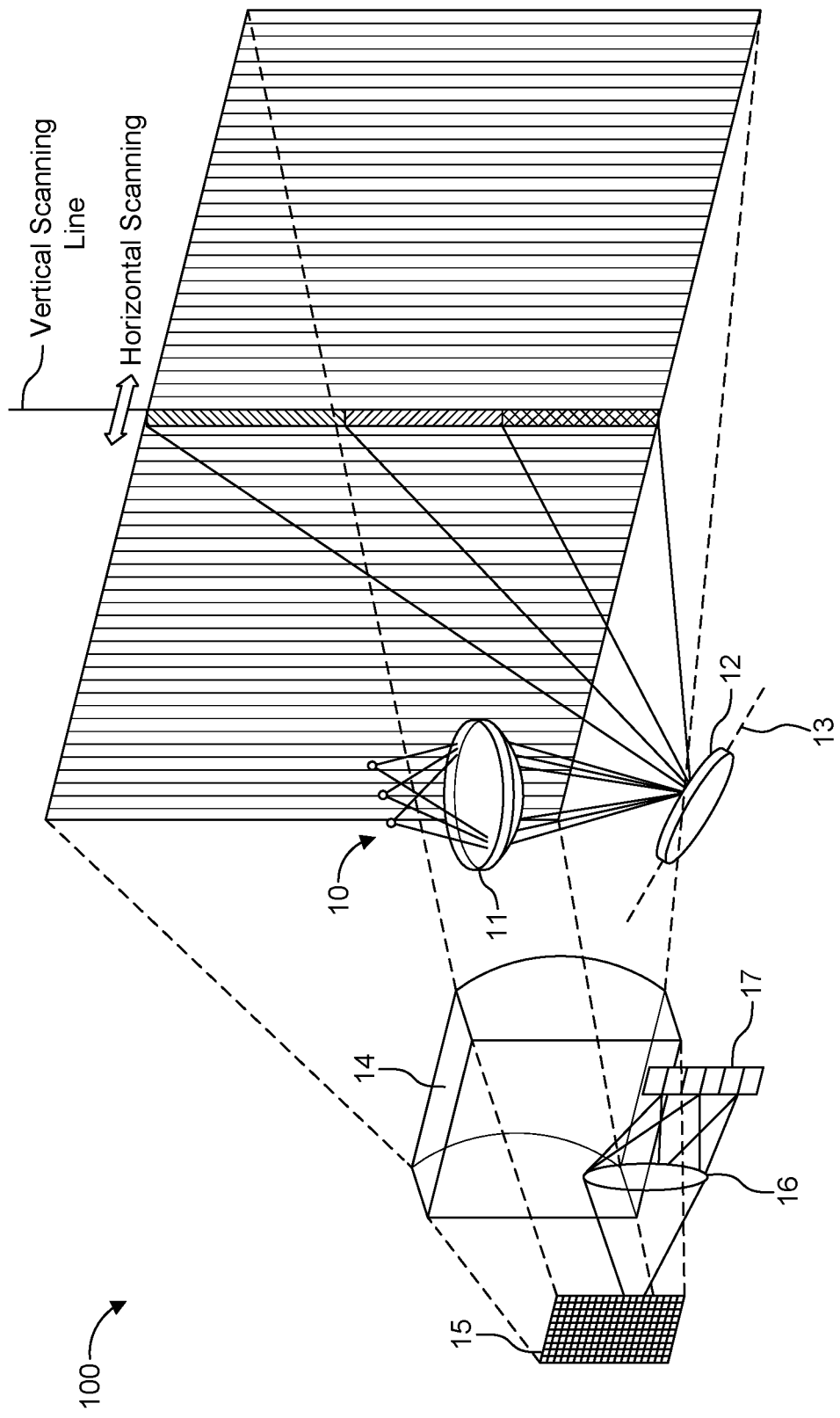
FIG. 1A is a schematic diagram of a LIDAR scanning system in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photos of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In LIDAR systems, a source transmits light pulses into a field of view and the light reflects from one or more objects by backscattering. In particular, LIDAR is a direct Time-of-Flight (TOF) system in which the light pulses (e.g., laser pulses of infrared light) are emitted into the field of view, and a pixel array detects and measures the reflected pulses. For example, an array of photodetectors receive reflections from objects illuminated by the light.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted until a time the reflected light pulse is received at the receiver (i.e., at the pixel array). The "time-of-flight" of the light pulse is then translated into a distance.

A scan such as a oscillating horizontal scan (e.g., from left to right and right to left of a field of view) can illuminate a scene in a continuous scan fashion. By emitting successive light pulses in different scanning directions, an area referred to as the "field of view" can be scanned and objects within the area can be detected and imaged. A raster scan could also be used.

FIG. 1A is a schematic diagram of a LIDAR scanning system 100 in accordance with one or more embodiments. The LIDAR scanning system 100 is an optical scanning device that includes a transmitter, including an illumination unit 10, a transmitter optics 11, and a one-dimensional (1D) MEMS mirror 12, and a receiver, including a primary optics 14, a digital micromirror device (DMD) 15, a secondary optics 16, and a 1D photodetector array 17.

The illumination unit 10 include three light sources (e.g., laser diodes or light emitting diodes) that are linearly aligned in single bar formation and are configured to transmit light used for scanning an object. The light emitted by the light sources is typically infrared light although light with other wavelength might also be used. As can be seen in the embodiment of FIG. 1A, the shape of the light emitted by the light sources is spread in a direction perpendicular to the transmission direction to form a light beam with an oblong shape perpendicular to a transmission. The illumination light transmitted from the light sources are directed towards the transmitter optics 11 configured to focus each laser onto a one-dimensional MEMS mirror 12. The transmitter optics 11 may be, for example, a lens or a prism. When reflected by the MEMS mirror 12, the light from the light sources are aligned vertically to form a one-dimensional vertical scanning line of infrared light or a vertical bar of infrared light. Each light source of the illumination unit 10 contributes to a different vertical region of the vertical scanning line. While three laser sources are shown, it will be appreciated that the number of laser sources are not limited thereto. For example the vertical scanning line may be generated by a single laser source, two laser sources or more than three laser sources.

The MEMS mirror 12 is a mechanical moving mirror (i.e., a MEMS micro-mirror) integrated on a semiconductor chip (not shown). The MEMS mirror 12 according to this embodiment is configured to rotate about a single axis and can be said to have only one degree of freedom for movement. Due to this single axis of rotation, the MEMS mirror 12 is referred to as a 1D MEMS mirror.

The MEMS mirror 12 is configured to oscillate "side-to-side" about a single scanning axis 13 such that the light reflected from the MEMS mirror 12 (i.e., the vertical scanning line of light) oscillates back and forth in a horizontal scanning direction. A scan comprises a scanning period or an oscillation period defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by the vertical bar of light by changing the angle of the MEMS mirror 12 on its scanning axis 13. For example, the MEMS mirror 12 may be configured to oscillate between +/−15 degrees to steer the light over 30 degrees making up the scanning range of the field of view. Thus, the field of view may be scanned, line-by-line, by a rotation of the MEMS mirror 12 though its degree of motion. One such sequence though the degree of motion (e.g., from −15 degrees to +15 degrees) is referred to as a single scan or scanning cycle. Multiple scans may be used to generate distance and depth maps, as well as 3D images by a processing unit. The horizontal resolution of the depth maps and images depends on the size of the incremental steps in rotation angle of the MEMS mirror 12 taken between scans.

While the transmission mirror is described in the context of a MEMS mirror, it will be appreciated that other 1D mirrors can also be used. In addition, the degree of rotation is not limited to +/−15 degrees, and the field of view may be increased or decreased according to the application.

Upon impinging one or more objects, the transmitted bar of vertical light is reflected back towards the LIDAR scanning system 100 where the primary optics 14 (e.g., a lens) receives the reflected light. The primary optics 14 directs the reflected light onto the DMD 15, which further deflects the received reflected light through the secondary optics 16 (e.g., a lens and/or a total internal reflection (TIR) prism) onto the photodetector array 17.

The DMD 15 is a two dimensional array of modulator elements, each of which may be referred to as a DMD pixel. Each modulator element may be a micro-mirror that is configured to be activated (i.e., turned ON) or deactivated (i.e., turned OFF) by receiving electrical signals sent from a controller (e.g., a microcontroller or other processing unit). The electrical signals control a tilting mechanism of a corresponding modulator element. Thus, the modulator element each have a corresponding data storage unit that are each individually addressable during an active illumination period, and each modulator element can be switched between at least two states many thousands of times per second. In the following examples, the modulator elements are referred to as micro-mirrors, but are not limited thereto, and could be other type of reflective element or pixel element that modulate light towards or away from the photodetector array 17.

In the activated state, a tilt of a micro-mirror is configured to reflect received light towards a corresponding pixel of the photodetector array 17. This received light originating from one of the light sources of the illumination unit 10 may also be referred to as useful light. In a deactivated state, a tilt of the micro-mirror is configured such that light impinging on the micro-mirror is deflected away from the photodetector array 17. This light may be referred to as ambient light. Here, the tilt of the micro-mirror may be deactivated such that the micro-mirror is flat. Since some portion of ambient light may still unintentionally reach the photodetector array 17 even when the micro-mirror is flat, a third state may be used depending on the amount of acceptable ambient noise. In a third state, a DMD micro-mirror may tilted in a different position to actively reflect light away from the photodetector array 17. This third state may be referred to as a "light dump" or a blocking state and may be used to redirect ambient light away from the photodetector array 17.

The DMD 15 is one type of reflective spatial light modulator (SLM) that may be used in accordance with the embodiments provided herein. An SLM includes an array of pixel elements that are configured to direct (e.g., reflect) light towards the photodetector array 17 when activated. In one example, the DMD 15 may be a 640×480 mirror array, with 640 mirror rows and 480 mirror columns, but is not limited thereto. The reflected vertical bar of light that is received at the receiver is projected onto the face of one or more mirror columns of the DMD 15. That is, the received reflected light extends along at least one column. For example, the received reflected light may impinge the DMD 15 on a line extending along a column. As the MEMS mirror 12 changes the transmission direction, the column or columns of mirrors at which the bar of light impinges changes. Thus, the column or columns receive the vertical bar of light in accordance with an angle position of the MEMS mirror 12 at which the bar of light was reflected. In order to coordinate the activation of one or more columns, angle position information from the MEMS Mirror 12 may therefore be used to determine which column or columns are to be activated in the DMD 15.

As used herein, a mirror column may be referred to as a DMD line or DMD column. Each mirror column of the DMD 15 may include multiple sets or groups of mirrors that are arranged to transmit light to a same pixel of the photodetector array 17. For example, each group may include two adjacent DMD pixels (e.g., a top DMD pixel and a bottom DMD pixel) which are both configured to transmit light incident thereon to a same pixel of the photodetector array 17, albeit the transmitted light will be incident on a different region of the active surface of the pixel (i.e., the light sensitive surface) of the photodetector array 17. Thus, within one mirror column, two or more contiguous DMD pixels in a first group may transmit light to a first pixel of the photodetector array 17, while two or more contiguous DMD pixels in a second group may transmit light to a second pixel of the of the photodetector array 17, and so on.

Furthermore, DMD pixels in a same row may transmit to a same corresponding pixel of the photodetector array, albeit again the transmitted light may be incident on a different region of the active surface of the pixel of the photodetector array 17. DMD pixels in different rows may transmit to different pixels of the photodetector array 17. Thus, similar DMD pixels groupings may be arranged in each column, where a first group in each column transmits light to a first pixel of the of the photodetector array 17, a second group in each column transmits light to a second pixel of the of the photodetector array 17, and so on.

The photodetector array 17 is configured to generate measurement signals used for generating a 3D map of the environment based on the reflected light (e.g., via TOF calculations and processing). For example, the photodetector array 17 may be an array of photodiodes or other light detection component capable of detecting and measuring light, and generating electric signals therefrom.

The photodetector array 17 can be any of a number of photodetector types; including avalanche photodiodes (APD), photocells, and/or other photodiode devices. Imaging sensors such as charge-coupled devices (CCDs) can be the photodetectors. In the examples provided herein, the photodetector array 17 is an APD array that comprises a signal column of APD pixels. The form factor of the APD pixels may be such that the width of each pixel is greater than the height.

The photodetector array 17 receives reflective light pulses. Since the time of transmission of each light pulse from the illumination unit 10 is known, and because the light travels at a known speed, a time-of-flight computation can determine the distance of objects from the photodetector array 17. A depth map can plot the distance information.

When a pulse of laser energy enters the field of view from the surface of MEMS mirror 12, reflective pulses appear when the laser light illuminates an object in the field of view. These reflective pulses arrive at DMD 15 that can also selectively reflect light onto the photodetector array 17. For example, one or more mirror columns of the DMD 15 may be activated to transmit light to the photodetector array 17 while other mirror columns are deactivated. Alternatively, one DMD pixel from each group in one or more columns may be activated while all other DMD pixels are deactivated. The deflected beam may be routed toward the photodetector array 17 by secondary optics 16, such as a TIR prism to minimize loss, or alternatively by a beam splitter.

In one example, for each distance sampling, a microcontroller triggers a laser pulse from each of the light sources of the illumination unit 10 and also starts a timer in a Time-to-Digital Converter (TDC) Integrated Circuit (IC). The laser pulse is propagated through the transmission optics, reflected by the target field, spatially filtered by the DMD 15, and captured by an APD of the APD array 17. The APD emits a short electrical pulse which is then amplified by an electrical signal amplifier. A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. The microcontroller may then increment the DMD pattern to test a new field location before restarting the distance measurements. By emitting successive light pulses in different directions, an area can be scanned, a three-dimensional image can be generated, and objects within the area can be detected.

In view of the above, the DMD array may be used to separate the usable light from the ambient light, and transmit only the usable light to the photodiodes (i.e., to be incident on the APD array). A single column of the DMD array or multiple spatially-separated columns of the DMD array may be activated, whereby the activation of which is determined by a synchronization with the MEMS mirror 12 performed by a controller.

For example, the transmission angle of the 1D MEMS mirror 12 is known by the controller (i.e., based on the rotation angle of the MEMS mirror 12 on its scanning axis). The DMD 15 may be calibrated such that the position of the MEMS mirror 12 on its scanning axis is synchronized by the controller such that certain mirror columns of the DMD 15 are activated. That is, since the angle and direction of the light pulse is known, the mirror column on which useful light is expected to be received may be determined. Pixels of the DMD are activated based on which of the DMD pixels the reflected useful light is expected to be received based on synchronization with the rotation angle of the MEMS mirror. For example, the controller may activate a corresponding DMD pixel column at which the useful light is expected such that the useful light is transmitted by the DMD pixel column to the APD pixel array. Thus, the controller may be configured to control both the timing of each light pulse, the scanning position or transmission angle of the MEMS mirror 12, and the activation of one or more DMD mirror (pixel) columns in synchronization with each other.

Compared to a 2D mirror which is used to scan light points to the field of view rather than light bars, the usage of a 1D mirror with the transmission of light bars as described herein allows the DMD 15 to be activated on a column-by-column basis rather than on a pixel-by-pixel basis resulting in a more effective scanning operation in view of the limited pulse emission frequency.

Received light incident on the deactivated pixels represents received ambient light. By deactivating these pixels, the ambient light is not transmitted to the APD pixel array, and the amount of ambient light (noise) incident at the APD pixel array can be reduced.

An APD array has a lower vertical dimension due to a lower number of photodiode elements or pixels when compared to a DMD array. For example, the APD array may be a 1×16 or 1×32 array, but is not limited thereto. Thus, while a DMD has a high resolution, the vertical resolution of the image may be limited by a vertical dimension of the APD array.

However, the vertical resolution of the image may be increased by activating every second or every third pixel in a DMD column in an interleaved manner so that each APD pixel receives light from multiple DMD pixels in a same DMD column. Several scans are necessary in this case, to collect the distance information correspondent to the entire DMD column.

Figure 1B:
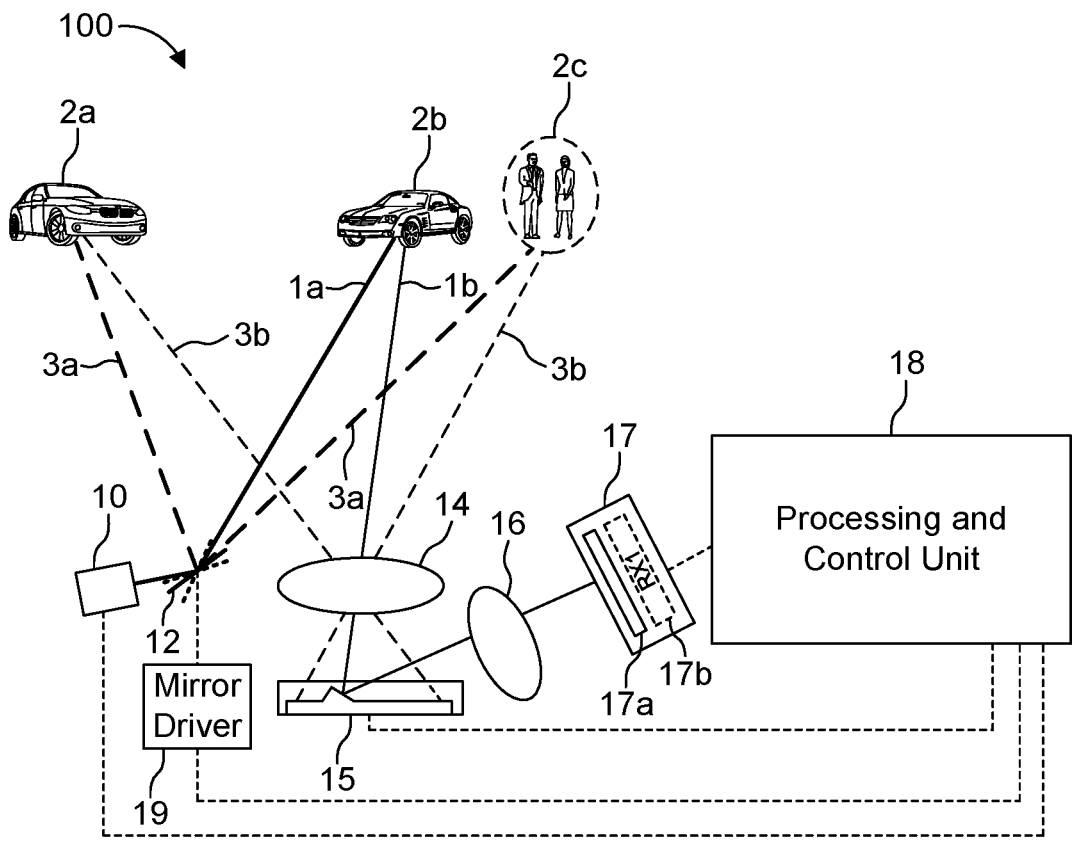
FIG. 1B is another schematic diagram of the LIDAR scanning system in accordance with one or more embodiments.

FIG. 1B is a schematic diagram of the LIDAR scanning system 100 in accordance with one or more embodiments. In particular, FIG. 1B shows additional features of the LIDAR scanning system 100, including example processing and control system components such as a processing and control unit 18 and a mirror driver 19.

As described above, the illumination unit 10 transmits a bar of light onto the MEMS mirror 12, which is then transmitted as a vertical scanning line of light 1a into a field of view in which one or more objects 2a, 2b, and 2c may be present. In addition, ambient light 3a as a result from environmental light (e.g., sunlight) may also be transmitted into the field of view. As a result, useful light 1b and ambient light 3b may be reflected back towards the receiver of the LIDAR scanning system 100 via backscattering.

The processing and control unit 18 includes a microcontroller and at least one processor, where at least the microcontroller is configured to control the mirror driver 19 and the individually addressable DMD pixels (micro-mirrors) of the DMD 15. Specifically, the mirror driver 19 drives the oscillation movement of the MEMS mirror 12 about its scanning axis based on control signals generated by the processing and control unit 18. Thus, the transmission angle of the light 1a and, hence the transmission direction of the light 1a, is controlled by the processing and control unit 18.

The processing and control unit 18 also generates control signals for driving the illumination unit 10 to control a transmission timing of the light pulses. A light pulse may be generated to coincide with a desired transmission direction according to the tilt of the MEMS mirror 12 (i.e., according to the oscillation or scanning position of the MEMS mirror 12).

Furthermore, the processing and control unit 18 is configured to generate control signals for controlling the state of each micro-mirror of the DMD 15 in synchronization with oscillation or scanning position of the MEMS mirror 12.

In this example, one or more DMD pixels in a mirror column of the DMD 15 is activated to coincide with a location at which the bar of useful light 1b is received at the DMD 15. When received, the bar of useful light 1b is incident along a mirror column, which may be predetermined by the processing and control unit 18 based on calibration information. For example, calibration information may include a correlation between a scanning position or tilt angle of the MEMS mirror 12 and a corresponding mirror column of the DMD 15 at which the useful light 1*b* is expected to be received such that the movement of the MEMS mirror 12 and the activation of micro-mirrors in corresponding mirror columns are synchronized. As the angle of the MEMS mirror 12 changes, so may the activation and deactivation of certain mirror columns.

Compared to a 2D mirror which is used to scan light points to the field of view rather than light bars, the usage of a 1D mirror with the transmission of light bars as described herein allows the DMD 15 to be activated on a column-by-column basis rather than on a pixel-by-pixel basis resulting in a more effective scanning operation in view of the limited pulse emission frequency.

The bar of useful light 1*b* may then be reflected by the activated pixels of the mirror column and projected across or along one or more segments of the photodetector array 17. The photodetector array 17 includes a 1D array of photodiodes 17*a* and an analog readout circuit 17*b* configured to read out electrical signals generated by photodiodes that receive light. These electrical signals are then transmitted to the processing and control unit 18 for data processing, including the time-of-flight computations as described above. For example, the processing and control unit 18 may include an analog-to-digital converter (ADC) for each photodiode and a field programmable gate array (FPGA) that record the time-of-flight.

Ambient light 3*b* that may also be received at the receiver (e.g., at the DMD 15) may be separated from the useful light 1*b* and deflected, at least partially, away from the photodetector array 17 to reduce the ambient noise in an image. Thus, the DMD 15 is configured to activate selected pixels (or a group of pixels) and dump ambient light.

Figure 1C:
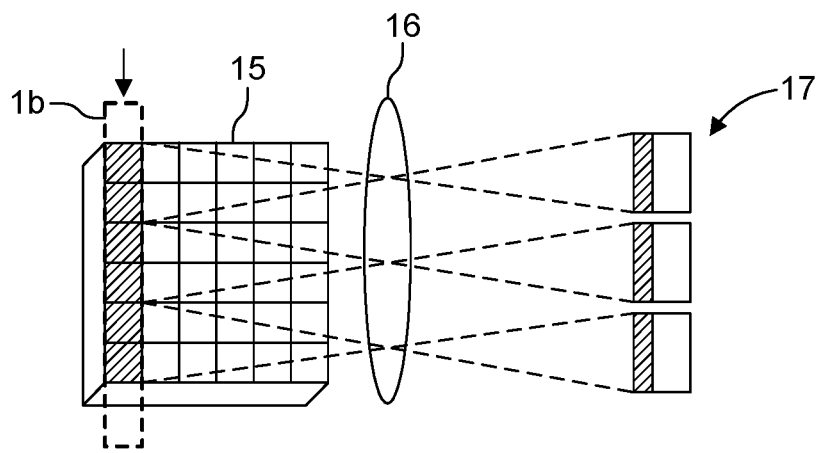
FIG. 1C is a schematic diagram illustrating components of a receiver of the LIDAR scanning system in accordance with one or more embodiments.

FIG. 1C is a schematic diagram illustrating part of a receiver of the LIDAR scanning system 100 in accordance with one or more embodiments. In particular, the DMD 15, secondary receiver optics 16, and the photodetector array 17 are shown and illustrate an example in which a bar of light (e.g., a laser line image) is received across or along a mirror column of the DMD 15. The number if DMD pixels and photodiode pixels have been reduced for illustrative purposes only.

The pixels in each mirror column are grouped in pairs such that a first (top) pair reflects light towards a first (top) photodiode of the photodetector array 17, a second (middle) pair reflects light towards a second (middle) photodiode of the photodetector array 17, and a third (bottom) pair reflects light towards a third (bottom) photodiode of the photodetector array 17. Each DMD pixel transmits light to a portion of an active region or area of the corresponding photodiode. Groups may also be expanded to three or more adjacent (i.e., contiguous) DMD pixels for each corresponding photodiode of the photodetector array 17.

In FIG. 1C, the pixels of the full, entire mirror column are activated to transmit the bar of light to the photodetector array 17. Thus, the bar of light is projected onto the photodetector array 17 across or along the full array of photodiodes as a line image. Here, the vertical resolution of the image is equal to a number of photodiodes in the photodetector array 17 (e.g., the number of APD pixels).

Some advantages of a 1D APD used with a DMD and 1D scanning over a true 2D silicon receiver is that only the active column receives light and causes the power dissipation, and then received by the APD. This reduces the total photocurrent of APD and its light load in general. In addition, there is the ability to shut all DMD columns (pixels) down producing dark condition for calibration and other purposes. Also, resolution enhancement is possible in both directions.

Figure 2:
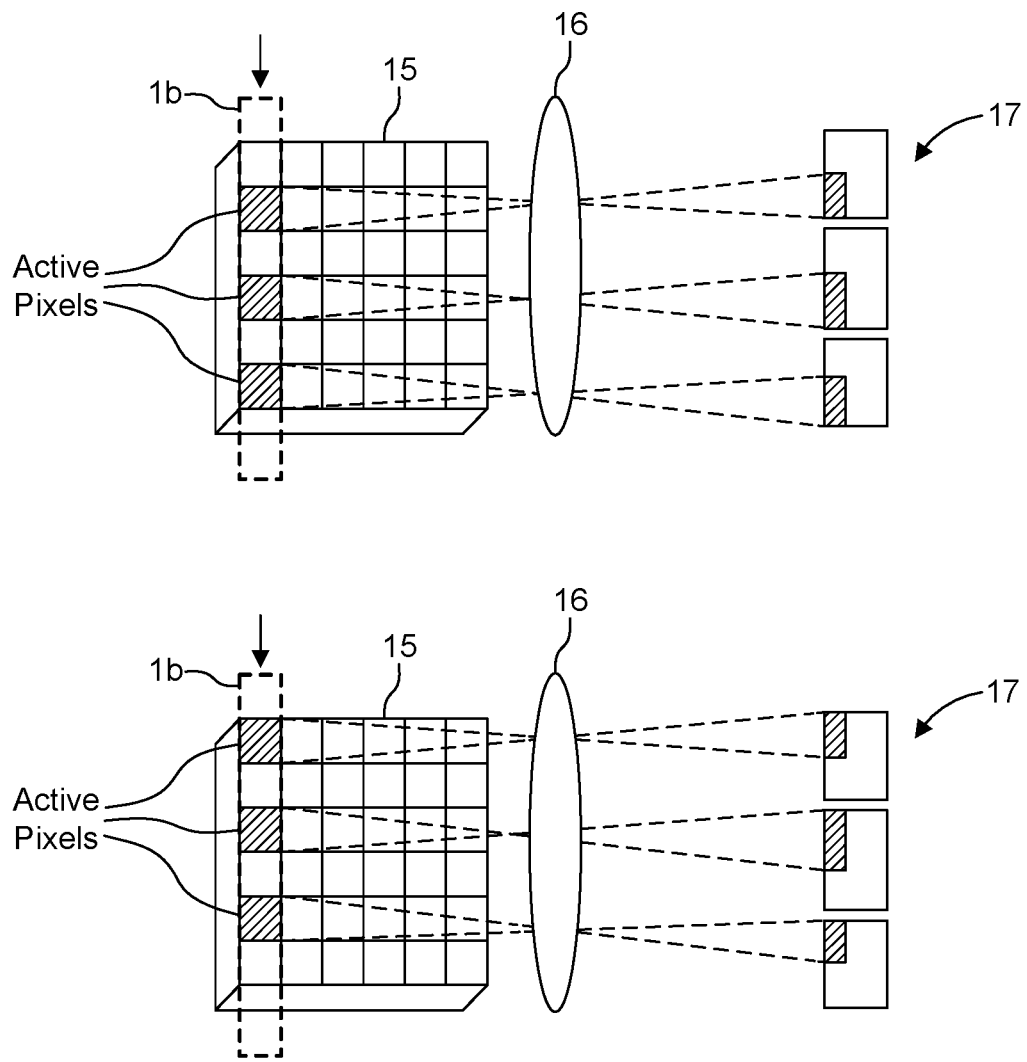
FIG. 2 is a schematic diagram illustrating components of a receiver of the LIDAR scanning system in accordance with one or more embodiments.

FIG. 2 is a schematic diagram illustrating components of a receiver of the LIDAR scanning system 100 in accordance with one or more embodiments. In particular, the DMD 15, secondary receiver optics 16, and the photodetector array 17 are shown and illustrate an example in which a bar of light (e.g., a laser line image) is received across or along a mirror column of the DMD 15. Similar to the DMD 15 shown in FIG. 1C, the DMD pixels are grouped into pairs, where each pixel group in each mirror column reflects light to a corresponding one of the photodiodes of the photodetector array 17.

In the top portion of FIG. 2, only the bottom DMD pixel of each DMD pixel group in the mirror column is activated. In the bottom portion of IFG. 2, only the top DMD pixel of each DMD pixel group in the mirror column is activated.

This activation scheme may be implemented in a interleaved approach to increase the vertical resolution of the image. For example, in a first scan or a first plurality of scans, a first DMD pixel in each pixel group of the mirror column may be activated, while the second DMD pixel in each group is deactivated (e.g., flat). In a second scan or a second plurality of scans, the second DMD pixel in each pixel group of the mirror column may be activated, while the first DMD pixel in each group is deactivated (e.g., flat). As shown, each bottom DMD pixel of each DMD pixel group transmits a portion of the bar of light received at the receiver, and the transmitted portion of light is incident on a portion of an active region of the corresponding photodiode of the photodetector array 17.

When pairs are used, the vertical resolution of the image can be effectively doubled by using this interleaved activation scheme. If each group were to include three DMD pixels, a third scan or a third plurality of scans would be implemented, but the vertical resolution of the image can be effectively tripled by using this interleaved activation scheme.

Here, a scan is used to refer to a scanning period, but half a scan (i.e., half a scanning period) may also be used for the interleaved activation and deactivation of the DMD pixels. For example, when scanning from a left edge to a right edge of the field of view, the first pixel in a group may be activated to transmit to the photodetector array 17, and, when scanning from the right edge to the left edge of the field of view, the second pixel in a group may be activated to transmit to the photodetector array 17.

FIG. 3 is a cross-sectional diagram of a receiver of the LIDAR scanning system 100 according to one or more embodiments. In particular, FIG. 3 illustrates multiple phases of a synchronous scanning mode implemented by the LIDAR scanning system 100. These phases are bidirectional over a scanning period. In the synchronous scanning mode, mirror columns of the DMD 15 are activated synchronously with the tilt angle (or transmission direction) of the MEMS mirror 12. For example, as the tilt angle of the MEMS mirror 12 changes during a scanning period, a single mirror column corresponding to the receiving direction is active at one time. In other words, a mirror column is activated that corresponds to the tilt angle of the MEMS mirror 12 at the time the illumination unit 10 transmits a light pulse. When activated, full column activation or interleaved column activation may be implemented, as described above.

Compared to a 2D mirror which is used to scan light points to the field of view rather than light bars, the usage of a 1D mirror with the transmission of light bars as described herein allows the DMD 15 to be activated on a column-by-column basis rather than on a pixel-by-pixel basis resulting in a more effective scanning operation in view of the limited pulse emission frequency.

It is noted that the illumination unit 10 may only be capable of emitting a subsequent light pulse after a (small) delay period. That is, the illumination unit 10 operates at a pulse emission frequency (e.g., 100 pulses per second) such that it shoots light pulses at emission intervals based on the pulse emission frequency. Since the MEMS mirror 12 is also moving between light pulses at its own oscillation frequency (e.g., 2 kHz), the transmission angle will have changed at a subsequent light pulse such that the receiving angle of light at the receiver is also changed. Due to this delay in transmitting subsequent light pulses, a subsequent mirror column to be activated is spatially separated (i.e., separated by at least one mirror column) from a previously activated mirror column in order to coincide with the change in tilt angle of the MEMS mirror 12 that has occurred by the time the subsequent light pulse is capable of being transmitted. The spacing between activated mirror columns may be constant due to the constant emission and oscillation frequencies. In other words, the spacing may be constant if angular speed of the MEMS mirror 12 is also constant. So generally speaking, the spacing is a function of the angular speed of the MEMS mirror 12. Alternatively, the spacing between activated mirror columns may be variable if the pulse emission frequency is dynamically changed during a scan.

Here, a set of three, spatially-separated mirror columns or non-neighboring mirror columns are sequentially activated during a scan or a sequence of scans in order to transmit the received light to the photodetector array 17. Multiple scans under this set up may be used in order to accumulate image data for the selected transmission directions, to process and confirm image data, and to remove errors.

After the requisite number of scans has been performed, a different set of spatially-separated mirror columns may be selected by the processing and control unit 18 according to new selected transmission/receiving directions. The next set of spatially-separated mirror columns may be shifted a predetermined amount (e.g., one or more pixel columns to the right or left) from the previous set of spatially-separated mirror columns. Each of the sets may contain a same number of columns. Each of the columns of the next set may be shifted by a same predetermined amount of columns from a respective column of the previous set.

The processing and control unit 18 may then coordinate the start time of the light pulses, the oscillation of the MEMS mirror 12, and the sequential activation of the new set of column mirrors in synchronous scanning mode. After the requisite number of scans has been performed, a different set of spatially-separated mirror columns may be selected, and so on.

If an interleaved activation scheme is used, the number of scans is increased (e.g., doubled when groups of pixel pairs are used). For example, a first scan or a first sequence of scans is used for each first DMD pixel in each group for each spatially-separated mirror columns of the set. Then, a second scan or a second sequence of scans is used for each second DMD pixel in each group for each spatially-separated mirror columns of the set. Once the interleaved scanning operation is complete for the current set of spatially-separated mirror columns, a different set of spatially-separated mirror columns may be selected by the processing and control unit 18 via a shift operation, and the interleaved activation of DMD pixel mirrors may be repeated for the new set of spatially-separated mirror columns.

FIG. 4 is a cross-sectional diagram of a receiver of the LIDAR scanning system 100 according to one or more embodiments. In particular, FIG. 4A illustrates multiple phases of a quasi-static scanning mode implemented by the LIDAR scanning system 100. These phases are bidirectional over a scanning period. In the quasi-static scanning mode, a set of mirror columns of the DMD 15 are activated simultaneously for an entire duration of scanning period or sequence of scanning periods. The mirror columns of the set are selected by the processing and control unit 18 to coincide with different tilt angles of the MEMS mirror 12 at which a light pulse will be transmitted by the illumination unit 10. Although the background light received by respective pixels of the photodetector array 17 is increased, the background light impinging on the pixels is still significantly reduced compared to an operation in which the pixels of the photodetector array 17 receive the full background illumination, for example, when all pixels of the DMD 15 activated.

Under the quasi-static scanning mode, several receiving directions are active for an entire duration of scanning period or sequence of scanning periods. After the requisite number of scans has been performed, a different set of spatially-separated mirror columns may be selected by the processing and control unit 18, and the scanning process repeats. For example, the next set of spatially-separated mirror columns may be shifted a predetermined amount (e.g., one or more pixel columns to the right or left) from the previous set of spatially-separated mirror columns.

When a pixel column is activated in quasi-static scanning mode, full column activation or interleaved column activation may be implemented, as described above. If an interleaved activation scheme is used, the number of scans is increased (e.g., doubled when groups of pixel pairs are used).

The processing and control unit 18 may be configured to switch between synchronous scanning mode, quasi-static scanning mode, and any other operating mode provided herein. The switching between different modes can be a dynamic switching during an operation of the LIDAR system. The switching can be based on certain requirements, driving situations of a vehicle using the LIDAR (slow driving, fast driving), etc. In general, the DMD device can be dynamically switched from a first operating mode to a second operating mode such that in a first operating mode a first activation scheme for activating the pixels may be used while in the second operating mode a second activation scheme different from the first activation scheme may be used. Furthermore, in the first operating mode a different number of pixels may be activated during a scanning compared to the second operating mode.

Figure 5:
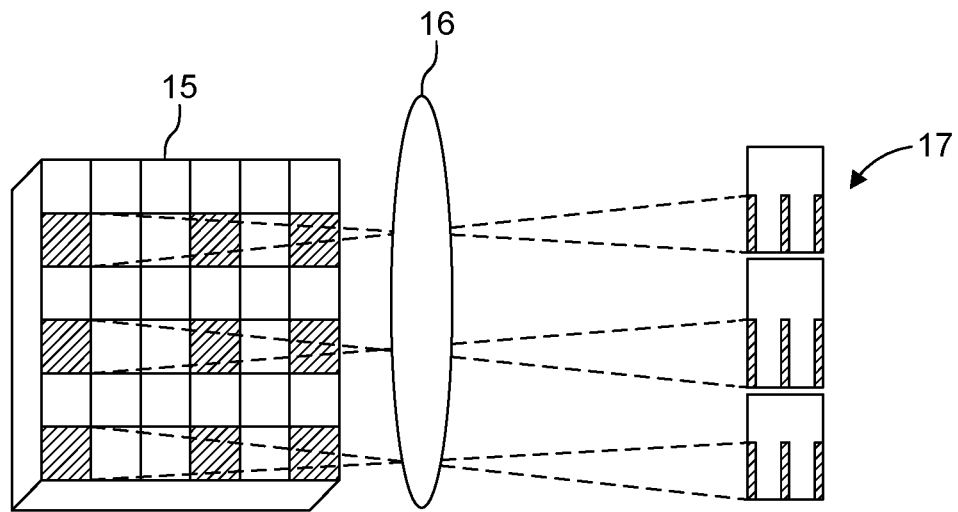
FIG. 5 is a schematic diagram illustrating components of a receiver of the LIDAR scanning system in accordance with one or more embodiments.

FIG. 5 is a schematic diagram illustrating components of a receiver of the LIDAR scanning system 100 in accordance with one or more embodiments. In particular, FIG. 5 shows multiple activated DMD pixels of the DMD 15 employing interleaved column activation under either synchronous scanning mode or quasi-static scanning mode. In addition, different regions of the active area of a photodiode on which received light is incident thereon are shown. The location of the different regions correspond to a corresponding activated DMD pixel of the DMD 15. For example, a left most DMD pixel reflects light towards a left most region of a photodiode of the photodetector array 17, and a right most DMD pixel reflects light towards a right most region of a photodiode of the photodetector array 17.

A region within the active area on which received light is incident thereon may shift vertically within a photodiode, similar to that shown in FIG. 2, as different DMD pixels are activated within a DMD column. Also, entire column regions within the active area may receive light, similar to that shown in FIG. 1C, when an entire DMD column is fully activated. For example, the three regions on each photodiode of the photodetector array 17 shown in FIG. 5 may be extended into three full column regions when the three corresponding DMD columns of the DMD 15 are fully activated.

When light is detected at a photodiode, the processing and control unit 18 knows which DMD pixels are activated. Thus, the processing and control unit 18 further knows the transmission and receiving directions of the light pulse and can use this information when generation an image.

As explained above, in the quasi-static mode, the pixels marked as "activated" may be simultaneously activated, while in the synchronous scanning mode the pixels marked as "activated" may be activated one after another when light is reflected to the DMD 15 at an angle corresponding to the respective column. In each mode, only one of the pixels for each group of the corresponding column which receives the light is activated, while the other pixels of the group are deactivated. Thus, the columns are not fully activated but only a portion of the pixels in the column is activated at a same instant.

Figure 6:
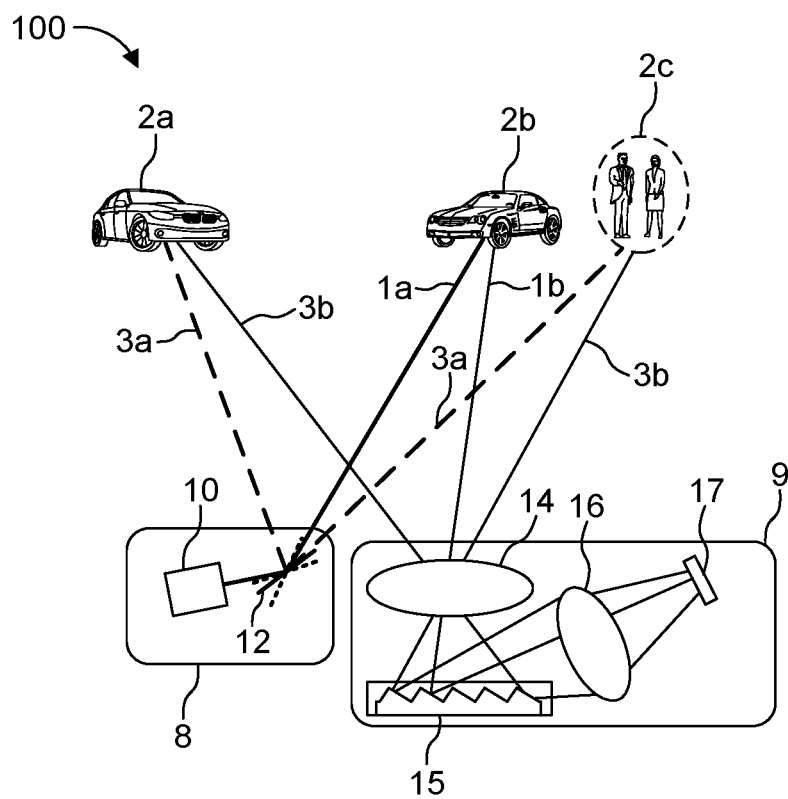
FIG. 6 is a schematic diagram of the LIDAR scanning system in one or more operating modes in accordance with one or more embodiments.

FIG. 6 is a schematic diagram of the LIDAR scanning system 100 in one or more operating modes in accordance with one or more embodiments. Similar to FIG. 1A, the LIDAR scanning system 100 includes a transmitter 8, including an illumination unit 10, a transmitter optics 11, and a 1D MEMS mirror 12, and a receiver 9, including a primary optics 14, a DMD 15, a secondary optics 16, and a 1D photodetector array 17. Here, the LIDAR scanning system 100 is configured in a simple 1D scanning LIDAR mode in which all DMD pixels of the DMD 15 are activated during a scan. Both reflected useful light 1b and reflected ambient light 3b are received at the receiver, and ultimately at the 1D photodetector array 17.

Figure 7:
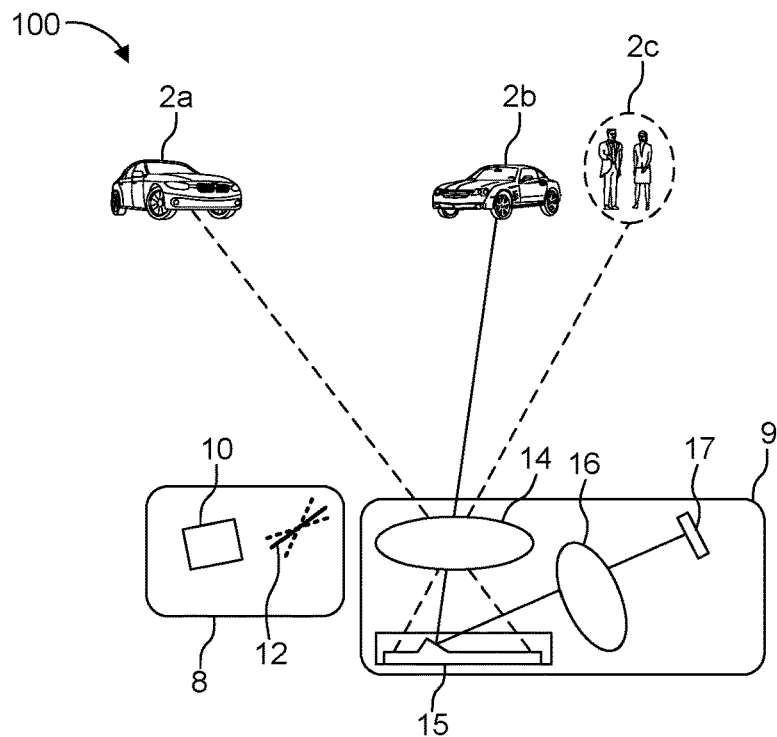
FIG. 7 is a schematic diagram of the LIDAR scanning system in one or more operating modes in accordance with one or more embodiments.

FIG. 7 is a schematic diagram of the LIDAR scanning system 100 in one or more operating modes in accordance with one or more embodiments. Similar to FIG. 1A, the LIDAR scanning system 100 includes a transmitter 8, including an illumination unit 10, a transmitter optics 11, and a 1D MEMS mirror 12, and a receiver 9, including a primary optics 14, a DMD 15, a secondary optics 16, and a 1D photodetector array 17. Here, the LIDAR scanning system 100 may be configured in a camera mode during which the illumination source 10 and the MEMS mirror 12 are deactivated. In camera mode, the processing and control unit 18 performs a scan of the field of view using ambient light by sequentially scanning the columns of the DMD 15 on an individual basis.

In many situations the camera mode can be used without deactivation of the laser (i.e., without deactivation of the illumination source 10). Because the ambient light (which is actually building the camera mode image) can be registered independently of pulsing light transmitted from the illumination sources 10 and reflected from a target object. The paths of DC photocurrent (carrying ambient light information) and AC photocurrent (carrying TOF information) are separated by the analog readout circuit 17b such that registering the two types of image data (i.e., ambient light information and TOF information) independently is possible.

Since the illumination source 10 is deactivated, only environmental light is received by the receiver 9. For example, sunlight reflected off of objects in the field of view may be received as environmental light (i.e., ambient light). The environmental light carries image data of the environment. The mirror columns of the DMD 15 may be sequentially activated one-by-one in a synchronous approach while the remaining mirror columns are deactivated such that a DMD scan of the mirror columns is performed. By doing so, ambient image data from each receiving direction can be recorded separately. As a result, a 2D image representing an "ambient light image" may be detected by the photodetector array 17 and recorded by the processing and control unit 18 (not shown). This ambient light image may establish a baseline image of the field of view used to generate a 3D image when the illumination source 10 is activated for scanning.

Each photodiode may generate current with a direct current (DC) component and an alternating current (AC) component in response to received light including a mixture of ambient light and useful light. The DC photocurrent component generated by a photodiode carries information of the ambient light, and the AC photocurrent component generated by the photodiode carries the time-of-flight (TOF) information of the useful light (i.e., of the light pulse). The processing and control unit 18 may process one or both photocurrent components to generate 2D or 3D image data. For example, the processing and control unit 18 may ignore the DC photocurrent component when processing the TOF information, may ignore the AC photocurrent component when processing ambient light information, or may process ambient light data in conjunction with processing TOF data.

Thus, ambient light information and TOF information may be recorded independently in either simultaneous or separate operations. If the ambient light information is being recorded in a separate operation, it is not required to deactivate the illumination source 10 since the analog readout circuit 17b is capable of separating the ambient light information from the TOF information and vice versa based on AC and DC photocurrent components, as described above, such that the processing and control unit 18 can process the two types of image data independently or together to generate a 2D or 3D image.

The camera mode may also be implemented for 2D scanning mirrors or other scanners transmitting light points to scan a field of view.

Additionally or alternatively, the LIDAR scanning system 100 may be configured in a LIDAR calibration mode during which the illumination source 10 and the MEMS mirror 12 are deactivated. Similar to the camera mode, a DMD scan of the mirror columns can be performed and a 2D image generated from the received ambient light based on the DMD scan. From the 2D image, the DMD and primary optics 14 can be calibrated such that a receiving angle of received light is paired with a mirror column of the DMD 15. Here, the processing and control unit 18 determines which mirror column best corresponds with each receiving angle, which further corresponds to a transmission angle established by the MEMS mirror 12. Thus, each column of the DMD array represents a certain angle in the landscape. Based on this determination, the processing and control unit 18 may generate a mapping that maps each DMD pixel to a MEMS mirror position.

Based on this calibration, the processing and control unit 18 is configured to synchronize the activation of the mirror columns with transmission/receiving angles of the light pulses generated by the illumination unit 10 (i.e., based on the synchronization with the tilt angle of the MEMS mirror 12).

The receiver optics (i.e., the primary optics 14) and the DMD array 15 coupled as a system represent a certain angle in the landscape and can be used to calibrate the MEMS mirror 12 and laser shooting performed by the illumination unit 10. During calibration, the processing and control unit 18 may initialize the illumination unit 10 to shoot laser pulses at a pulse emission frequency at a certain MEMS mirror phase (i.e., at a specific angular position on the scanning axis 13).

While the MEMS mirror 12 is fixed at the set phase, the processing and control unit 18 may activate different DMD columns in sequential scans until a DMD column being activated produces maximum photodiode signal—in some embodiments referred to as an APD signal. The maximum photodiode signal may be a predetermined amount or a set threshold amount that is to be reached or exceeded for a selection to be made. Alternatively, the values of each photodiode signal produced by each sequentially activated column can be compared with each other, and the DMD column corresponding to the value being the highest among all recorded values may be selected as the best DMD column.

Upon detecting and selecting a best DMD column, the processing and control unit 18 maps that exact MEMS mirror phase with a certain DMD column such that the two are coupled together. Then, the phase of the MEMS mirror 12 is shifted to the next angle, and the process repeats for mapping each MEMS mirror phase to a DMD column. This process may similarly be used on a pixel-by-pixel bases of the DMD, as opposed to on a column basis.

Figure 8:
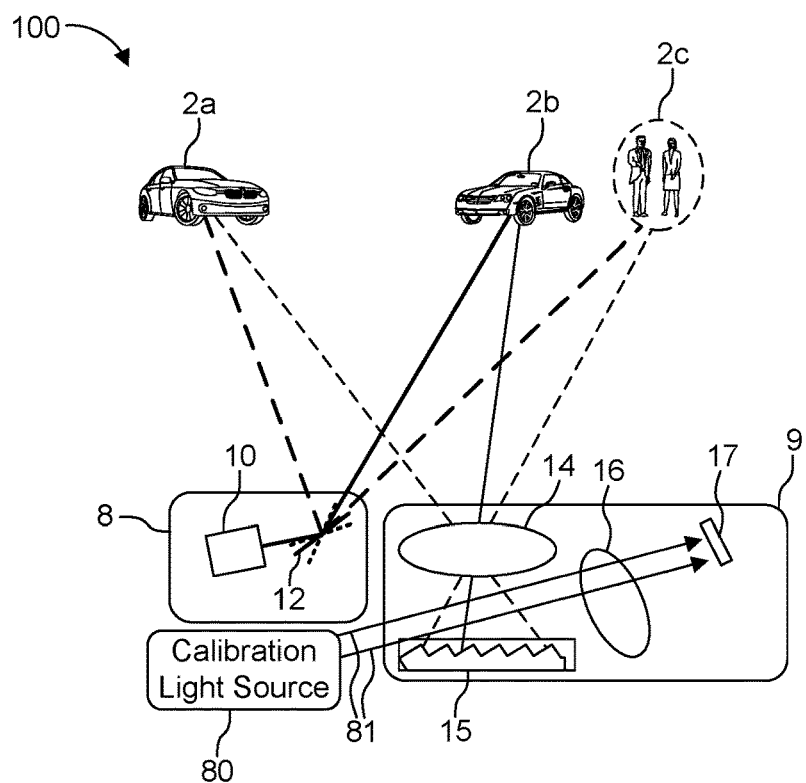
FIG. 8 is a schematic diagram of the LIDAR scanning system in one or more operating modes in accordance with one or more embodiments.

FIG. 8 is a schematic diagram of the LIDAR scanning system 100 in one or more operating modes in accordance with one or more embodiments. Similar to FIG. 1A, the LIDAR scanning system 100 includes a transmitter 8, including an illumination unit 10, a transmitter optics 11, and a 1D MEMS mirror 12, and a receiver 9, including a primary optics 14, a DMD 15, a secondary optics 16, and a 1D photodetector array 17. Here, the LIDAR scanning system 100 is configured in a photodetector gain calibration mode (e.g., APD gain calibration mode) during which all DMD pixels are turned off in a blocking state. In other words, all DMD pixels are tilted in a direction to actively direct all light away from the photodetector array 17 or to dump all received light. Thus, all incoming light at the primary optics 14 of the receiver 9 is blocked from the photodetector array 17 to create a dark condition, similar to a shutter being closed on a camera.

In addition, the LIDAR scanning system 100 may also include a calibration light source 80, separate from the illumination source 10, is provided that bypasses the DMD 15 and transmits calibration light 81 to the photodetector array 17. The light intensity of the calibration light source 80 is known such that a high voltage of the photodetector array 17 may be determined and set according to the direct current (DC) generated by the photodetector array 17 in response to the received calibration light and based known light intensity thereof. The high voltage of the photodetector array 17 establishes the responsivity or sensitivity of the photodetector array 17.

Figure 9:
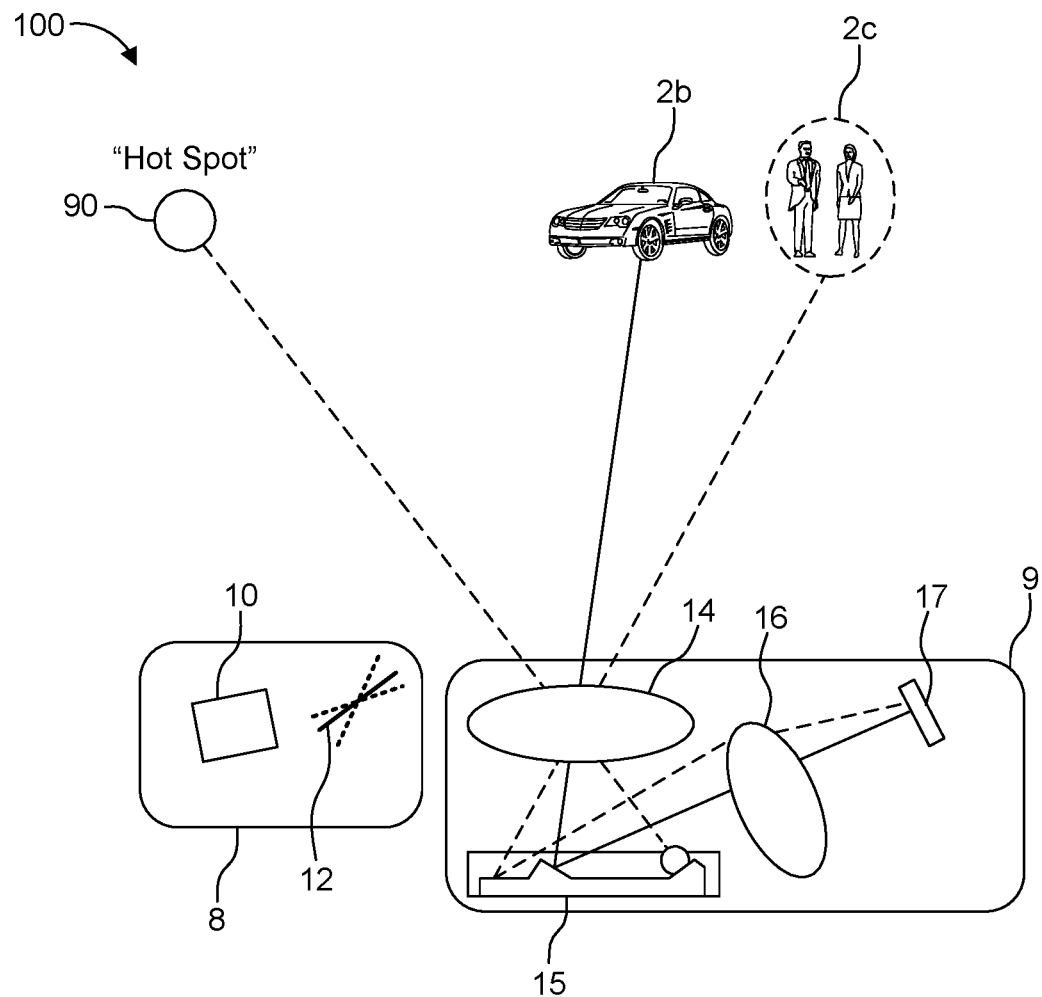
FIG. 9 is a schematic diagram of the LIDAR scanning system in one or more operating modes in accordance with one or more embodiments.

FIG. 9 is a schematic diagram of the LIDAR scanning system 100 in one or more operating modes in accordance with one or more embodiments. Similar to FIG. 1A, the LIDAR scanning system 100 includes a transmitter 8, including an illumination unit 10, a transmitter optics 11, and a 1D MEMS mirror 12, and a receiver 9, including a primary optics 14, a DMD 15, a secondary optics 16, and a 1D photodetector array 17. Here, the LIDAR scanning system 100 is configured in a hot spot detection mode during which a hot spot 90 of ambient light is detected and blocked. For example, the sun may be in the field of view and behave as the hot spot 90.

The processing and control unit 18 may be configured to detect an area on the photodetector array 17 where ambient light of high intensity is received, even when a corresponding DMD pixel, group of DMD pixels, or DMD column is deactivated (i.e., flat). For example, a DC component of the current generated by one or more photodiodes can be measured, representing measured ambient light. Thus, the processing and control unit 18 may evaluate ambient light levels received at the photodetector array 17 and determine when and where a hot spot is present. The processing and control unit 18 may determine, based on the photodiode that receives the ambient light, which DMD pixel or pixels are receiving the ambient light from the hot spot.

For example, in a first step, all DMD columns may be scanned (e.g., sequentially activated) and a "hot" column or plurality of columns may be detected from which light from a hot spot is detected. Upon detecting one or more hot columns, processing and control unit 18 may scan pixels in each of the hot columns and detect a plurality of "hot" pixels from which the light from the hot spot is detected. The detected hot pixels may then be set into a blocking state.

Since AC and DC photocurrent components are decoupled from each other and can be measured separately, this hot spot detection, corresponding to the AC photocurrent component, can be performed in conjunction with a TOF scanning operation during which TOF information is generated as well as in its own independent operation.

Once the DMD pixel or pixels are determined, the processing and control unit 18 may set the DMD pixel or pixels into a blocking state to block the transmission of the ambient light to the photodetector array 17. In other words, the DMD pixel or pixels are tilted in a direction to actively direct the ambient light away from the photodetector array 17, and the hot spot can be effectively eliminated. The "hot spot" DMD pixels may be permanently set in the blocking state during a scanning operation until the processing and control unit 18 determines that the hot spot is no longer present.

Additional example embodiments are provided below.

Embodiments

1. A Light Detection and Ranging (LIDAR) system, comprising:
   a receiver comprising:
      a photodetector array configured to detect light and generate electrical signals based on the detected light; and
      a spatial light modulator having an array of modulator elements that comprises a plurality of columns and a plurality of rows, each of the modulator elements is configured to switchably direct the light towards and away from the photodetector array, wherein the spatial light modulator is configured to receive the light from objects in a field of view corresponding to ambient light reflected therefrom;
   a controller configured to sequentially activate sections of the spatial light modulator such that activated modulator elements of an activated section direct the light towards the photodetector array; and at least one processor configured to receive the electrical signals from the photodetector array and generate a two-dimensional image that represents an ambient light image of the field of view.

2. The LIDAR system of embodiment 1, further comprising:
a laser illumination arrangement configured to transmit pulsed light,
wherein the controller is configured to control the laser illumination arrangement to transmit the pulsed light, during a first scanning operating mode, to the objects in the field of view, and configured to control the laser illumination arrangement, during a second operating mode, such that the pulsed light is not transmitted to the objects in the field of view,
wherein the controller is configured to sequentially activate the sections of the spatial light modulator during the second operating mode, and
wherein the at least one processor is configured to receive the electrical signals from the photodetector array and generate the two-dimensional image that represents the ambient light image of the field of view during the second operating mode.

3. The LIDAR system of embodiment 2, wherein the at least one processor is configured to receive the electrical signals from the photodetector array and generate a three-dimensional image of the field of view during the first scanning operating mode, wherein the at least one processor is further configured to match pixel information of the two-dimensional image with pixel information of the three-dimensional image.

4. The LIDAR system of embodiment 1, wherein the photodetector array is an avalanche photodiode array.

5. The LIDAR system of embodiment 1, wherein the controller is configured to sequentially activate the plurality of columns of the spatial light modulator as the activated portions on an individual basis such that remaining columns of the plurality of columns are deactivated.

6. The LIDAR system of embodiment 1, wherein:
the controller configured to sequentially activate the plurality of columns of the spatial light modulator as the activated portions on an individual basis from a first column of the spatial light modulator to a second column of the spatial light modulator.

7. The LIDAR system of embodiment 1, wherein:
each column of the plurality of columns corresponds to a different receiving direction from the field of view, and
the at least one processor is configured to separately record ambient image data from each different receiving direction based on a scan of the plurality of columns, and generate the two-dimensional image based on the recorded ambient image data from each different receiving direction.

8. The LIDAR system of embodiment 1, wherein:
the at least one processor is configured to calibrate the spatial light modulator by determining a receiving angle of the light for each column of the plurality of columns based on pixel values derived from the electrical signals, and mapping each column to a specific receiving angle.

9. A method of scanning a field of view implemented by a Light Detection and Ranging (LIDAR) system, the method comprising:
receiving beams of light from the field of view on a spatial light modulator that includes a two-dimensional array of modulator elements arranged in a plurality of rows and a plurality of columns, wherein each received beam of light extends along one of the plurality of columns;
determining a first set of spatially separated columns of the plurality of columns that correspond to receiving directions of a first set of receiving beams of light corresponding to a first scanning procedure; and
activating, at least partially, each column of the first set of spatially separated columns during the first scanning procedure such that each of the first set of receiving beams of light is directed towards a photodetector array, while deactivating remaining columns of the plurality of columns during the first scanning procedure such that light is not received at the photodetector array.

10. The method of embodiment 9, further comprising:
shifting a pattern of activated columns of the spatial light modulator, comprising:
determining a second set of spatially separated columns of the plurality of columns that correspond to receiving directions of a second set of receiving beams of light corresponding to a second scanning procedure; and
activating, at least partially, each column of the second set of spatially separated columns during the second scanning procedure such that each of the second set of receiving beams of light beam of light is directed towards the photodetector array, while deactivating remaining columns of the plurality of columns during the second scanning procedure such that light is not received at the photodetector array, wherein the first set of spatially separated columns is different from the second set of spatially separated columns.

11. The method of embodiment 10, wherein the first set of spatially separated columns and the second set of spatially separated columns are shifted by a fixed number of columns.

12. The method of embodiment 10, wherein each column of the first set of spatially separated columns is separated during the first scanning procedure by a first number of deactivated columns and wherein each column of the second set of spatially separated columns are separated during the second scanning procedure by a second number of deactivated columns.

13. The method according to embodiment 12, wherein the first number and the second number of deactivated columns are equal.

14. The method of embodiment 10, wherein each of the second set of spatially separated columns is a neighboring column with respect to one of the first set of spatially separated columns.

15. The method of embodiment 9, wherein activating the first set of spatially separated columns comprises:
activating the first set of spatially separated columns simultaneously for the first scanning procedure.

16. The method of embodiment 9, wherein activating the first set of spatially separated columns comprises:
activating the first set of spatially separated columns sequentially during the first scanning procedure such that activating each of the first set of spatially separated columns is synchronous with a receiving time of a corresponding one of the first set of receiving beams of light.

17. The method of embodiment 9, wherein the modulator elements in each of the plurality of columns are arranged into groups, wherein the modulator elements of a group are configured to, when activated, direct light towards a same pixel of the photodetector array, and the modulator elements of different groups in a same column are configured to, when activated, direct light towards different pixels of the photodetector array.

18. The method of embodiment 17, further comprising:
interleaving an activation of the modulator elements in each group of the first set of spatially separated columns for different scanning periods of the first scanning procedure.

19. The method of embodiment 17, wherein the first scanning procedure comprises a first scan of the field of view and a second scan of the field of view, the method further comprising:
performing the first scan during which a first reflective element in each group of the first set of spatially separated columns is activated and a second reflective element in each group of the first set of spatially separated columns is deactivated; and
performing the second scan during which the second reflective element in each group of the first set of spatially separated columns is activated and the first reflective element in each group of the first set of spatially separated columns is deactivated.

20. The method of embodiment 9, further comprising:
transmitting the beams of light into the field of view from a transmission mirror that oscillates about a single scanning axis such that the beams of light are projected as a vertical scanning line into the field of view, the vertical scanning line moving horizontally across the field of view as the transmission mirror oscillates about the single scanning axis.

21. A method of scanning a field of view implemented by a Light Detection and Ranging (LIDAR) system, the method comprising:
receiving beams of light from the field of view on a spatial light modulator that includes a two-dimensional array of modulator elements arranged in a plurality of rows and a plurality of columns, wherein each beam of light extends along one of the plurality of columns and different beams of light received along different columns correspond to different receiving directions of the different beams of light;
wherein the modulator elements in each of the plurality of columns are arranged into groups such that the modulator elements of a group are configured to, when activated, direct light towards a same pixel of a photodetector array, and the modulator elements of different groups in a same column are configured to, when activated, direct light towards different pixels of the photodetector array;
interleaving an activation of the modulator elements in each group for different scanning periods.

22. The method of embodiment 21, further comprising:
selecting a set of columns of the plurality of columns that correspond to receiving directions the different beams of light; and
interleaving the activation of the modulator elements in each group of the selected set of columns for different scanning periods, while deactivating remaining reflective elements in columns not included the selected set of columns of the spatial light modulator during the different scanning periods.

23. The method of embodiment 21, further comprising:
transmitting the beams of light into the field of view from a transmission mirror that oscillates about a single scanning axis such that the beams of light are projected as a vertical scanning line into the field of view that moves horizontally across the field of view as the transmission mirror oscillates about the single scanning axis,
wherein a respective first modulator element of each group of a first column of the plurality of columns is activated during a first scan while a beam of light is received from a first horizontal position, wherein the first horizontal position corresponds to the first column,
wherein other modulator elements of each group of the first column are deactivated during the first scan,
wherein a respective second modulator element of each group of the first column is activated, while a beam of light is received from the first horizontal position during a second scan, and
wherein other modulator elements of each group of the first column are deactivated during the second scan.

24. An optical scanning device configured to implement a method according to any of embodiments 9-23.

25. The optical scanning device, comprising:
a laser light source configured to generate laser pulses at regular intervals;
an optical arrangement configured to generate laser beams based on the laser pulses, the laser beams having an oblong shape extending in a direction perpendicular to a transmission direction of the laser beams;
a one-dimensional scanning mirror configured to oscillate about a single scanning axis and direct the laser beams at different directions into a field of view;
a photodetector array configured to detect light and generate electrical signals based on the detected light; and
a spatial light modulator having an array of reflective elements that comprises a plurality of columns, each column of the plurality of columns includes a plurality of reflective elements configured to switchably direct the light towards the photodetector array, wherein the spatial light modulator is configured to receive the light reflected from objects in the field of view corresponding to the transmitted laser beams.

26. The optical scanning device according to embodiment 25, wherein the photodetector array is a one-dimensional APD array.

27. The optical scanning device according to any of embodiments 25 and 23, wherein the spatial light modulator is a DMD.

28. The optical scanner device according to any of embodiments 25-27, wherein the spatial light modulator is configured to receive the light reflected from the objects along a respective column, wherein light received at different columns corresponds to different angle positions of the one-dimensional scanning mirror at the reflection of the laser beams.

29. The optical scanning device according to any of embodiments 25-28, further comprising a controller configured to control the laser light source, the one-dimensional scanning mirror, and the spatial light modulator according to one or more operating modes, including synchronous scanning mode, quasi-static, full column activation mode, interleaving pixel activation mode, camera mode, LIDAR calibration mode, photodetector gain calibration mode, and hot spot detection mode.

30. The optical scanning device according to any of embodiments 25-29, wherein the controller configured dynamically switch between any one of the operating modes, including synchronous scanning mode, quasi-static scanning mode, full column activation mode, interleaving pixel activation mode, camera mode, LIDAR calibration mode, photodetector gain calibration mode, and hot spot detection mode.
31. The optical scanning device according to any of embodiments 25-30, further comprising at least one processor electrically coupled to the photodetector array and configured to receive the electrical signals, derive and/or record image data therefrom, and generate a 2D image or a 3D image from the recorded image data.
32. The optical scanning device according to embodiment 31, wherein the at least one processor includes processing circuitry configured to perform time-of-flight computations based on the received electrical signals.
33. The optical scanning device according to embodiments 25-32, configured to implement the method according to any of embodiments 9-23.
34. A LIDAR device, comprising:
a LIDAR transmitter configured to scan a field of view with a plurality of laser beams according to a transmission interval, the LIDAR transmitter including a one-dimensional scanning mirror configured to oscillate about a single scanning axis such that the plurality of laser beams are projected as a vertical scanning line into the field of view that moves horizontally across the field of view as the transmission mirror oscillates about the single scanning axis; and
a LIDAR receiver comprising a spatial light modulator configured to receive reflected laser beams from objects in a field of view corresponding to the plurality of laser beams transmitted into the field of view, and activate a different pixel column for each of the received reflected laser beams such that an activated pixel column corresponds a receiving direction of a corresponding one of the reflected laser beams that is incident along a length of the activated pixel column.
35. The LIDAR device according to embodiment 34, further comprising a controller configured to synchronize the activation of the plurality of pixel columns with a movement of the one-dimensional scanning mirror and the transmission interval of the plurality of laser beams.
36. The LIDAR device according to embodiment 35, wherein the controller activates the plurality of pixel columns based on a synchronous scanning mode and/or a quasi-static scanning mode.
37. The LIDAR device according to embodiment 36, wherein the controller activates pixel elements in the plurality of pixel columns based on full column activation mode and/or interleaving pixel activation mode.
38. The LIDAR device according to any of embodiments 34-37, further comprising a controller configured to initiate a laser beam sequence at the LIDAR transmitter according to a start time aligned with a desired plurality of transmission angles of the one-dimensional scanning mirror.
39. The LIDAR device according to any of embodiments 33-38, wherein the receiving directions of each of the reflected laser beams corresponds to one of the transmission angles of the one-dimensional scanning mirror.
40. A method of calibrating a gain of a photodetector array in a LIDAR system, the method comprising:
configuring all pixels of a spatial light modulator into a blocking state such that all light received through a primary optics of a LIDAR receiver is deflected away from a photodetector array;
transmitting calibration light from a calibration light source towards the photodetector array;
receiving, by a processing unit, electrical signals generated by the photodetector array in response to the calibration light; and
determining, by the processing unit, calibration information based on the electrical signals and an intensity of the calibration light; and
setting, at least one calibration parameter for the photodetector array based on the calibration information.
41. The method according to embodiment 40, wherein the electrical signals include a direct current (DC) component and wherein the calibration information comprises a high voltage value of the photodetector array.
42. The method according to embodiment 40 or 41, wherein the calibration is a dynamic calibration during an in the field operation of the LIDAR system.
43. A method of detecting a hot spot of ambient light in a LIDAR system, the method comprising:
detecting ambient light at a photodetector array, wherein the ambient light originate from a hot spot in a field of view of the LIDAR system;
determining, by a processing unit, at least one pixel element of a spatial light modulator that receives the ambient light from which the ambient light is received at the photodetector array; and
setting, by a control unit, the at least one pixel element into a blocking state such that the ambient light is deflected away from the photodetector array.
44. A method of operating a LIDAR system comprising:
scanning a field of view by transmitting light from a laser to the field of view;
receiving reflected light from the field of view on a spatial light modulator that includes a two-dimensional array of reflective elements arranged in a plurality of rows and a plurality of columns;
operating the spatial light modulator in a first operating mode, and
switching an operation of the spatial light modulator such that the spatial light modulator is operated in a second operating mode different to the first operating mode, wherein a number of reflective elements of the spatial light modulator that are concurrently deactivated during respective scans in the first operating mode is different to a number of reflective elements that are concurrently deactivated during respective scans in the second operating mode.
45. A method of dynamically switching operating modes of a LIDAR system, the method comprising:
scanning a field of view by transmitting light from a Laser to the field of view;
receiving reflected light from the field of view on a spatial light modulator that includes a two-dimensional array of reflective elements arranged in a plurality of rows and a plurality of columns;
operating the spatial light modulator in a first operating mode, and
dynamically switching an operation of the spatial light modulator such that the spatial light modulator is operated in a second operating mode different to the first operating mode, wherein an activation scheme of the reflective elements of the spatial light modulator used in the first operating mode is different to an activation scheme used in the second operating mode.
46. A LIDAR device, comprising:
a scanner to scan a field of view by transmitting light from a Laser to the field of view;
a spatial light modulator receiving reflected light from the field of view, the spatial light modulator comprising a two-dimensional array of reflective elements arranged in a plurality of rows and a plurality of columns;

wherein the LIDAR device is configured to operate the spatial light modulator in a first operating mode and in a second operating mode different to the first operating mode, wherein a number of reflective elements of the spatial light modulator that are concurrently deactivated during respective scans in the first operating mode is different to a number of reflective elements that are concurrently deactivated during respective scans in the second operating mode.

47. A LIDAR device, comprising:

a scanner to scan a field of view by transmitting light from a Laser to the field of view;

a spatial light modulator receiving reflected light from the field of view the spatial light modulator comprising a two-dimensional array of reflective elements arranged in a plurality of rows and a plurality of columns;

wherein the spatial light modulator is configured to operate the spatial light modulator in a first operating mode, and to operate in a second operating mode different to the first operating mode, wherein the spatial light modulator is further configured to dynamically switch an operation of the spatial light modulator from the first operating mode to the second operating mode, wherein an activation scheme of the reflective elements of the spatial light modulator used in the first operating mode is different to an activation scheme used in the second operating mode.

Although embodiments described herein relate to a MEMS device with a mirror, it is to be understood that other implementations may include optical devices other than MEMS mirror devices. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A Light Detection and Ranging (LIDAR) system, comprising:

a receiver comprising:
 a photodetector array configured to detect light and generate electrical signals based on the detected light; and
 a spatial light modulator having an array of modulator elements that comprises a plurality of columns and a plurality of rows, each modulator element of the array of modulator elements is configured to switchably direct the light towards and away from the photodetector array, wherein the spatial light modulator is configured to receive the light from objects in a field of view corresponding to ambient light reflected therefrom;

a controller configured to sequentially activate sections of the spatial light modulator such that activated modulator elements of an activated section direct the light towards the photodetector array;

a processing circuit configured to receive the electrical signals from the photodetector array and generate a two-dimensional image that represents an ambient light image of the field of view; and a laser illumination arrangement configured to transmit pulsed light,
 wherein the controller is configured to control the laser illumination arrangement to transmit the pulsed light towards the objects in the field of view,
 wherein the photodetector array is configured to simultaneously receive the ambient light and the pulsed light reflected by the objects,
 wherein the photodetector array is configured to generate DC signal components exclusively attributed to receiving the ambient light and generate AC signal components exclusively attributed to receiving the pulsed light, and
 wherein the processing circuit is configured to separate the DC signal components and the AC signal components to generate the two-dimensional image from the separated DC signal components and to generate a three-dimensional image of the field of view from the separated AC signal components.

2. The LIDAR system of claim 1, wherein the processing circuit is further configured to match pixel information of the two-dimensional image with pixel information of the three-dimensional image to compensate the three-dimensional image.

3. The LIDAR system of claim 1, wherein the controller is configured to determine a first set of spatially separated columns to activate the plurality of columns that correspond to receiving directions of a first set of receiving beams of light corresponding to a first scanning procedure, wherein the controller is configured to activate, at least partially, each column of the first set of spatially separated columns during the first scanning procedure such that each of the first set of receiving beams of light is directed towards the photodetector array, while deactivating remaining columns of the plurality of columns throughout an entirety of the first scanning procedure such that light is not directed at the photodetector array by the remaining columns, and wherein each column of the first set of spatially separated columns is separated from at least one other column of the first set of spatially separated columns during the first scanning procedure by a first number of deactivated columns.

4. The LIDAR system of claim 1, wherein:

modulator elements of the array of modulator elements in each of the plurality of columns are arranged into column groups of two or more modulator elements such that modulator elements of a column group are configured to, when activated, direct light towards a same pixel of a photodetector array, and modulator elements of different column groups in a same column are configured to, when activated, direct light towards different pixels of the photodetector array, or modulator elements of the array of modulator elements in each of the plurality of rows are arranged into row groups of two or more modulator elements such that modulator elements of a row group are configured to, when activated, direct light towards a same pixel of the photodetector array, and modulator elements of different row groups in a same row are configured to, when activated, direct light towards different pixels of the photodetector array.

5. A method of scanning a field of view implemented by a Light Detection and Ranging (LIDAR) system, the method comprising:

transmitting pulsed light into the field of view;

receiving, by a photodetector array, light from the field of view, wherein the photodetector array is configured to receive the light from objects in the field of view corresponding to ambient light and the pulsed light reflected therefrom, wherein the photodetector array is configured to simultaneously receive the ambient light and the pulsed light reflected by the objects;

generating, by the photodetector array, DC signal components exclusively attributed to receiving the ambient light and AC signal components exclusively attributed to receiving the pulsed light;

separating, by a processing circuit, the DC signal components from the AC signal components;

generating, by the processing circuit, a two-dimensional image that represents an ambient light image of the field of view from the DC signal components;

generating, by the processing circuit, a three-dimensional image of the field of view from the AC signal components;

configuring all pixels of a spatial light modulator into a blocking state such that all light received through a primary optics of a LIDAR receiver is deflected away from the photodetector array;

transmitting calibration light from a calibration light source towards the photodetector array;

receiving, by the processing circuit, electrical signals generated by the photodetector array in response to the calibration light;

determining, by the processing circuit, calibration information based on the electrical signals and an intensity of the calibration light; and setting, by a controller, at least one calibration parameter for the photodetector array based on the calibration information.

6. The method according to claim 5, wherein the electrical signals include a DC component, and wherein the calibration information comprises a high voltage value setting of the photodetector array.

7. The method according to claim 5, wherein a calibration, including transmitting the calibration light and setting the at least one calibration parameter, is a dynamic calibration during an in-the-field operation of the LIDAR system.

8. A method of scanning a field of view implemented by a Light Detection and Ranging (LIDAR) system, the method comprising:

transmitting pulsed light into the field of view;

receiving, by a photodetector array, light from the field of view, wherein the photodetector array is configured to receive the light from objects in the field of view corresponding to ambient light and the pulsed light reflected therefrom, wherein the photodetector array is configured to simultaneously receive the ambient light and the pulsed light reflected by the objects;

generating, by the photodetector array, DC signal components exclusively attributed to receiving the ambient light and AC signal components exclusively attributed to receiving the pulsed light;

separating, by a processing circuit, the DC signal components from the AC signal components;

generating, by the processing circuit, a two-dimensional image that represents an ambient light image of the field of view from the DC signal components;

generating, by the processing circuit, a three-dimensional image of the field of view from the AC signal components;

detecting a hot spot of ambient light at the photodetector array, wherein the ambient light originates from a hot spot in a field of view of the LIDAR system;

determining, by the processing circuit, at least one pixel element of a spatial light modulator that receives the ambient light from which the ambient light is received at the photodetector array; and setting, by a controller, the at least one pixel element into a blocking state such that the ambient light is deflected away from the photodetector array.

9. A method of scanning a field of view implemented by a Light Detection and Ranging (LIDAR) system, the method comprising:

transmitting pulsed light into the field of view;

receiving, by a photodetector array, light from the field of view, wherein the photodetector array is configured to receive the light from objects in the field of view corresponding to ambient light and the pulsed light reflected therefrom, wherein the photodetector array is configured to simultaneously receive the ambient light and the pulsed light reflected by the objects;

generating, by the photodetector array, DC signal components exclusively attributed to receiving the ambient light and AC signal components exclusively attributed to receiving the pulsed light;

separating, by a processing circuit, the DC signal components from the AC signal components;

generating, by the processing circuit, a two-dimensional image that represents an ambient light image of the field of view from the DC signal components;

generating, by the processing circuit, a three-dimensional image of the field of view from the AC signal components;

receiving the light from the field of view on a spatial light modulator that includes a two-dimensional array of reflective elements arranged in a plurality of rows and a plurality of columns;

operating the spatial light modulator in a first operating mode; and switching an operation of the spatial light modulator such that the spatial light modulator is operated in a second operating mode different to the first operating mode, wherein a number of reflective elements of the spatial light modulator that are concurrently deactivated during respective scans in the first operating mode is different to a number of reflective elements that are concurrently deactivated during respective scans in the second operating mode.

10. The method of claim 9, further comprising:

dynamically switching an operation of the spatial light modulator during the scanning of the field of view such that the spatial light modulator is operated in the second operating mode different to the first operating mode, wherein an activation scheme of the reflective elements of the spatial light modulator used in the first operating mode is different from an activation scheme used in the second operating mode.

11. The method of claim 9, further comprising:

controlling a laser light source of the light, a one-dimensional scanning mirror, and the spatial light modulator according to an activated operating mode, including two or more selected from a synchronous scanning mode, a quasi-static scanning mode, a full column activation mode, an interleaving pixel activation mode, a camera mode, a LIDAR calibration mode, a photodetector gain calibration mode, and a hot spot detection mode.

12. The method of claim 9, wherein a number of reflective elements of the spatial light modulator that are concurrently deactivated during respective scans in the first operating mode is different from a number of reflective elements that are concurrently deactivated during respective scans in the second operating mode.

* * * * *